US007139653B2

(12) United States Patent
Ringger et al.

(10) Patent No.: US 7,139,653 B2
(45) Date of Patent: Nov. 21, 2006

(54) COMMON CONTROL INTERFACE FOR DIVERSE AUTOMATED MANUAL TRANSMISSIONS

(75) Inventors: Kurt A. Ringger, Bluffton, IN (US); John F. Rotz, Fort Wayne, IN (US); Mark A. Thurber, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 361 days.

(21) Appl. No.: 10/891,922

(22) Filed: Jul. 15, 2004

(65) Prior Publication Data
US 2006/0015235 A1    Jan. 19, 2006

(51) Int. Cl.
*B60K 1/00* (2006.01)
*G06F 7/00* (2006.01)

(52) U.S. Cl. .............................. 701/51; 701/56; 701/64; 74/473.17; 74/473.21

(58) Field of Classification Search .................. 701/51, 701/55, 56, 64, 1; 74/336 R, 473.17, 473.21; 180/292, 312
See application file for complete search history.

(56) References Cited
U.S. PATENT DOCUMENTS

| | | |
|---|---|---|
| 4,899,279 A | 2/1990 | Cote et al. |
| 5,272,939 A | 12/1993 | Markyvech et al. |
| 5,335,566 A | 8/1994 | Genise et al. |
| 5,272,939 A | 12/1994 | Markyvech et al. |
| 5,624,350 A | 4/1997 | Bates |
| 5,816,100 A | 10/1998 | Fowler et al. |
| 5,865,705 A | 2/1999 | Shamoto et al. |
| 5,974,351 A * | 10/1999 | Croft et al. ................... 701/48 |
| 6,056,669 A * | 5/2000 | Marshall ....................... 74/335 |
| 6,066,071 A | 5/2000 | Janecke et al. |
| 6,149,545 A | 11/2000 | Genise et al. |
| 6,151,977 A * | 11/2000 | Menig et al. .............. 74/336 R |
| 6,289,332 B1 * | 9/2001 | Menig et al. ................... 707/1 |
| 6,738,701 B1 | 5/2004 | Wilson |

OTHER PUBLICATIONS

SAE International, "Surface Vehicle Recommended Practice", SAE J1939, 2003.

* cited by examiner

*Primary Examiner*—Tan Q. Nguyen
(74) *Attorney, Agent, or Firm*—Jeffrey P. Calfa; Dennis K. Sullivan; Susan L. Lukasik

(57) ABSTRACT

A gearshift to transmission controller interface is based on a controller area network and a gearshift interface interposed between the gearshift and associated displays and the network bus. The shift controller can be made universal to all transmission types of automated manual transmissions by incorporation of a library program relating to a transmission type.

12 Claims, 6 Drawing Sheets

COMMON CONTROL INTERFACE FOR DIVERSE AUTOMATED MANUAL TRANSMISSIONS

BACKGROUND OF THE INVENTION

1. Technical Field

The invention relates to control arrangements for vehicle transmissions and more particularly to a common shifter interface and communication sub-system for use with automated manual transmission controllers sourced from different manufacturers.

2. Description of the Problem

Manual (standard) transmissions for motor vehicles may be fitted with transmission control modules to provide automated control of the transmission. The transmission control modules (TCMs) or, as they are sometimes called, smart vehicle transmissions, cooperate with a shift controller which provides operator controls and generates electrical signals indicating the operator's choices relating to mode control and gear shift selection exercised through the operator controls. The operator controls may appear conventional, for example a floor mounted gearshift lever may be provided, or they may be less conventional, such as steering wheel mounted buttons. Among the options typically provided the operator are: (1) the ability to select an operating mode, i.e. the operator may shift manually or leave gear selection to the TCM; (2) the ability to request an up or downshift; and (3) the ability to select the operating gear. U.S. Pat. No. 6,151,977 is an illustration of a smart transmission arrangement for a manual transmission. Smart transmissions made by different manufacturers have heretofore required their own unique shift control arrangements. A change in transmission has required either new programming of a transmission controller or new control arrangements. Operator commands to the transmission control modules thus have not been coupled to the TCMs over a data bus such as a controller area network notwithstanding the face that TCMs have typically been fitted for such communication with other vehicle controllers, such as the engine controller and a vehicle body computer (sometimes referred to as the electrical system control module or "ESC"). These systems are typically applied to trucks and other heavy-duty vehicles and differ from transmission for cars where mechanical linkage is used for control of a manual transmission.

Controller area networks (CANs) have proven effective at reducing the number of dedicated communication paths between the numerous switches, sensors, devices and gauges installed on the vehicles, having essentially replaced much of the control wiring of the classical motor vehicle harness with a single twisted pair bus. The widespread adoption of CAN's has been encouraged by the publication by the Society of Automotive Engineers of its SAE J1939 standard. However, shift controllers have not heretofore communicated with transmission control modules over a controller area network, even though transmission control modules have previously been connected to such networks.

The specific manner of implementing multiplexed communications is outside the scope of the present invention, which works within the defined SAE J1939 protocol. Details relating to wiring standards, standardized message formats and types and collision detection and contention access to the bus are well known. The J1939 protocol provides an open protocol, standard message format and definition of the performance requirements of the medium of the physical layer. A controller area network (CAN) may be readily implemented utilizing commercial integrated circuits such as the C167 CAN controller made by Siemens AG of Germany.

Controller area networks can link several digital controllers positioned around a vehicle along with an electrical system controller (ESC) for inter controller communication. Remote digital controllers are not addressed per se, but may be programmed to respond to any signal appearing on the bus to initialize a particular function. Transmission controllers may be a remote digital controller. The controllers may be programmed to allow the device to react to local conditions, signals received over the bus, and combinations of the two sources of data. The ESC may pass requests and instructions received for operations of certain devices, and execute vehicle load management programs.

SUMMARY OF THE INVENTION

According to the invention there is provided a gearshift to transmission controller interface based on a controller area network. Operator transmission controls and displays are generic for various automated manual transmissions from various manufacturers. Typically all communications between a shift controller and the TCM occurs over a controller area bus. The interface takes inputs from the controls and generates signals for driving the display based on messages received from a transmission controller or consistent with the use of the operator controls. The interface includes a shift controller which is coupled between the operator transmission controls and the display elements on the one hand and the controller area network on the other. The shift controller includes logic means for determining operator selections input through the operator transmission controls and memory accessible by the logic means storing a library matching possible operator selections with message types and for sending messages identifying operator selections over the controller area network for receipt by any vocational controller programmed to respond thereto. The automated manual TCM is coupled to the controller area network both for receiving messages identifying operator selections and messages from other controllers, e.g. engine RPMs and vehicle speed. The TCM will typically respond to a request by changing modes or moving the transmission to the requested gear. The TCM transmits signals over the CAN indicating transmission gear status, and this signal provides a return indication of compliance or non-compliance with the request. A request may not be complied with should vehicle conditions make a particular request dangerous or impossible. Under these circumstances the transmission status signal will indicate that the request has not been complied with by its failure to change to reflect the request.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF A PREFERRED EMBODIMENT

Figure 1:
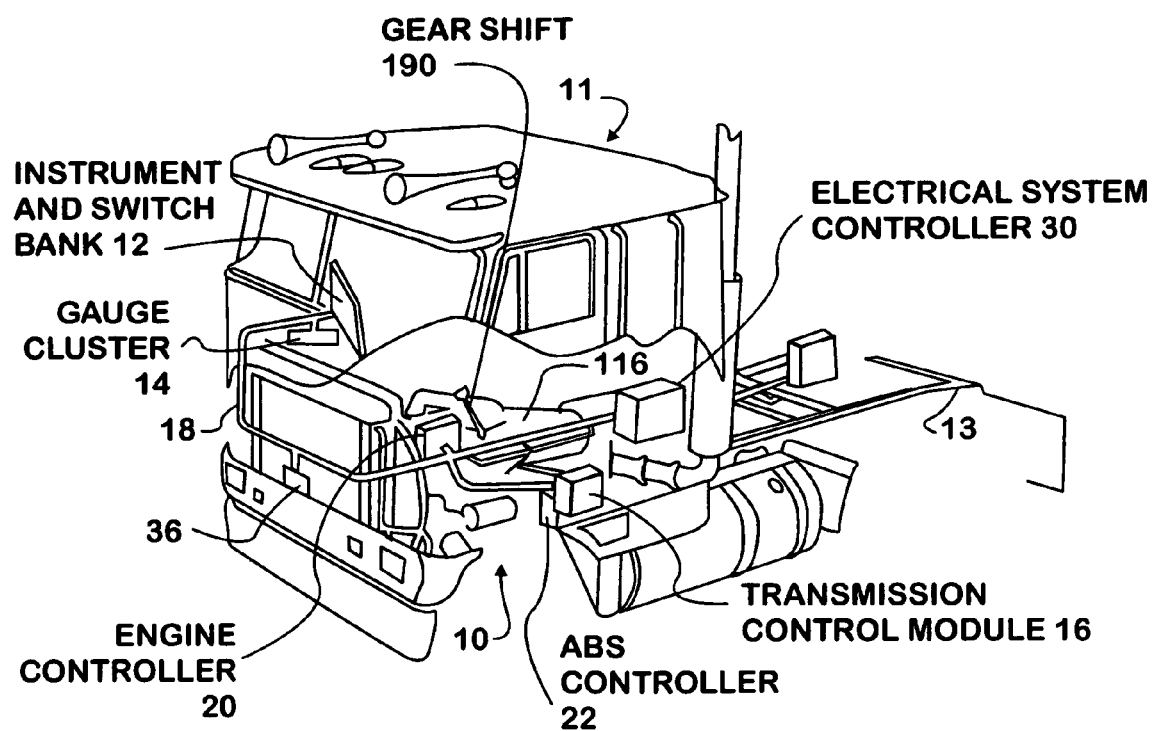
FIG. 1 is a perspective view in partial cutaway of a vehicle truck and an electrical system for the truck.

Referring now to the figures and in particular to FIG. 1, the invention is described with reference to a preferred embodiment. FIG. 1 is a perspective view of a vehicle electrical system 10 installed on a tractor 11. Vehicle electrical system 10 comprises an electrical system controller (ESC) 30, which is the primary component of a vehicle electronic control system. ESC 30 interacts with a number of vocational controllers disposed on vehicle 11. Most active vehicle components are directly controlled by one of a group of autonomous, vocational controllers, which include a gauge cluster 14, an engine controller 20, a automated manual transmission controller 16, an auxiliary instrument and switch bank 12, an antilock brake system (ABS) controller 22, and the shift controller 190 (see FIG. 2), all of which are connected to ESC 30 over the common data bus or link 18. Most of the autonomous controllers include local data processing and programming and are typically supplied by the manufacturer of the controlled component. Serial data link/bus 18 may be a twisted pair cable constructed in accordance with SAE J1939 protocol. The controller area network is externally accessible via a diagnostic port 36 to allow reprogramming and diagnostic routines to be performed. Although the autonomous controllers handle many functions locally and some are functionally complete without reference to ESC 30, they report data received by ESC 30 and can in return receive operational requests from ESC 30 or from other controllers. Tractor 11 is equipped with an automated manual (or "standard") transmission 116 under the control of a transmission control module (TCM) 16. Operator gear selection request are made through an operator interface which includes a gearshift lever 190. The operator interface provides inputs to shift controller 90 which in turn formats the requests for transmission over a CAN bus 18 for receipt by TCM 16 and any other controller programmed to act on the requests. TCM 16 is programmed to return selected data to the shift controller over bus 18 such as identification of the transmission type, and the actual gear position. As explained below, circumstances may prevent or delay execution of an operator gearshift request. The TCM 16 will typically handle engagement and disengagement of the vehicle clutch for an automated manual transmission 116.

Figure 2:
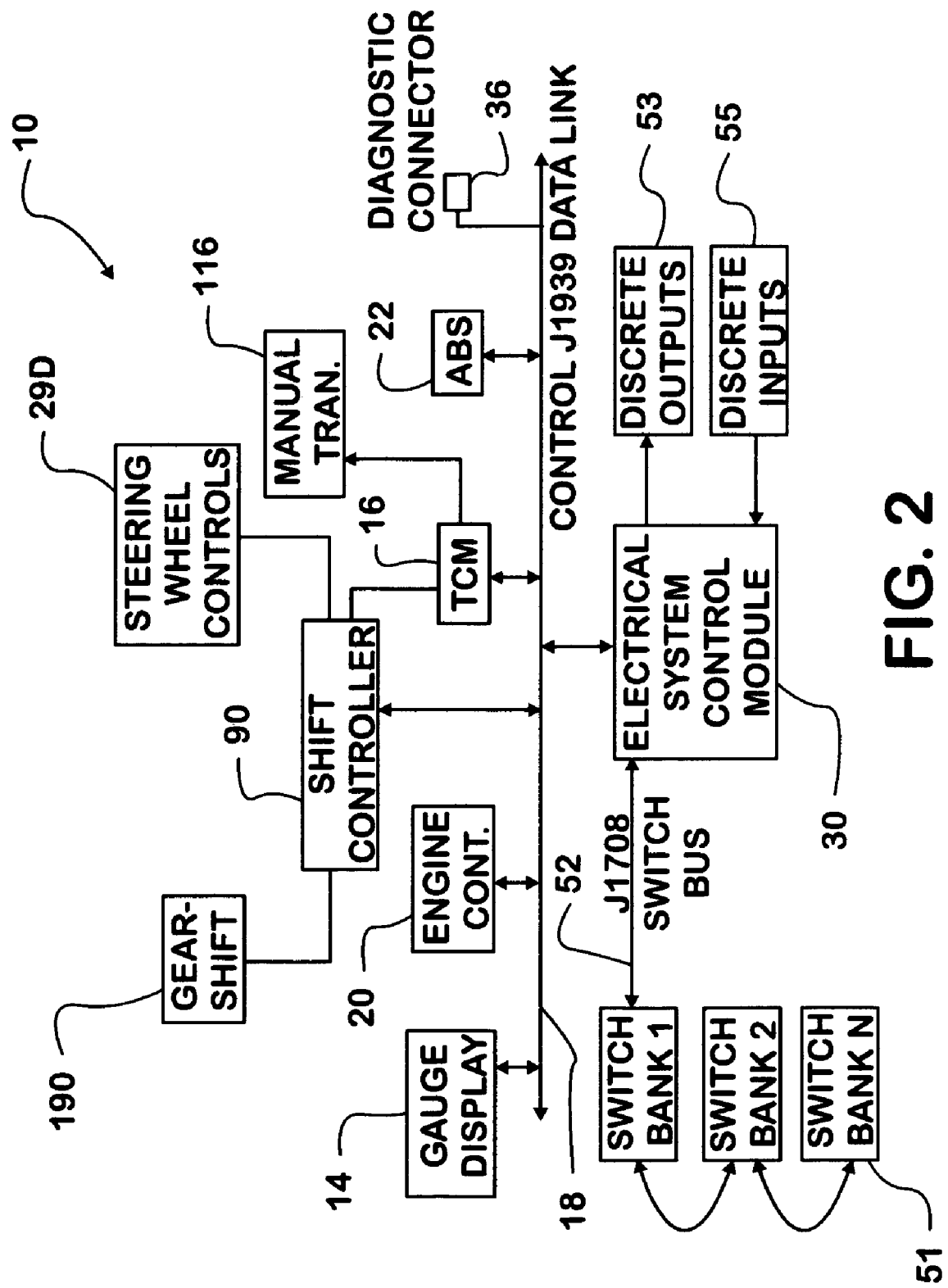
FIG. 2 is a high-level block diagram of a controller area network for a vehicle.

FIG. 2 is a schematic illustration of the vehicle control system 10. Electrical system controller 30 communicates with local vocational controllers over SAE J1939 compliant serial data link (bus) 18. The J1939 standard provides an industry standard, open protocol, predefining a number of message types which can be broadcast on the bus. Controllers for substantially common vehicle components such as transmissions, engines and the like communicate with ESC 30 over serial data link 18. A diagnostic connector 36 taps into serial data link 18 allowing communications over the bus to be monitored for diagnostic purposes and for portions of the programming of ESC 30 may be overwritten. The various vocational controllers for a vehicle, including a gauge cluster display controller 14, the engine controller 20, the automated manual transmission controller 16, and an anti-lock brake system controller 22 all communicate with one another over bus 18. As provided by the present invention, a shift controller 90 also communicates with the various vocational controllers and ESC 30 over bus 18, providing indication of operator choices for gear position entered through a gearshift 190 or through steering wheel controls 290. The terms "gear shift" and "steering wheel controls" should be taken to include the switches, levers and resistor nets used to determine the gear or shift direction selected by an operator. In addition, a single direct electrical connection may be provided between shift controller 90 and TCM 16.

ESC 30 also provides monitoring several bi-state switches in a group of switch banks 51 over a relatively low baud rate SAE J1708 data link 52. ESC 30 can also be directly connected to several devices and sensors directly, which are grouped as discrete outputs 53 and discrete inputs 55. The switch bank 51, or discrete inputs 55, may serve as alternate input sources for connection to operator controls for a transmission, although such an arrangement is not the preferred embodiment of the present invention. ESC 30 and shift controller 90 could be programmed to exchange messages, ESC 30 indicating to the shift controller the status of various switches and discrete inputs and the shift controller formatting messages for TCM 16, or ESC 30 could be programmed to generate the messages directly. Because the inputs to ESC 30 are binary, rather than mixed analog and binary signals as done in the preferred embodiment, the programming would not be identical to that described below, but should, given the present teachings, become routine to one skilled in the art. TCM 16 conventionally provides transmission status signals over bus 18 of the controller area network. Such signals have been used by other vocational controllers such as engine controller 20.

Figure 3:
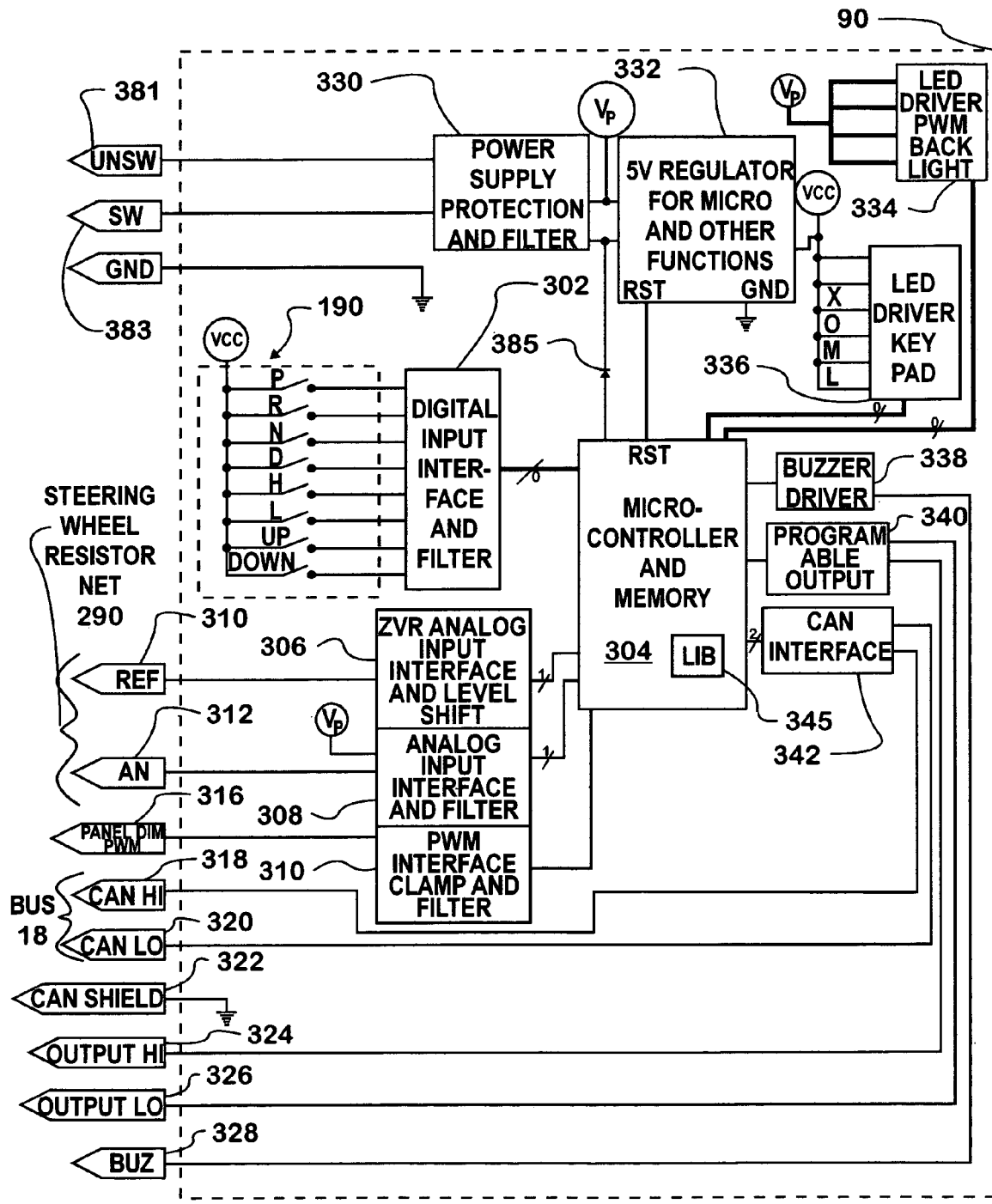
FIG. 3 is a detailed schematic of a multi-transmission gearshift controller for an automated manual transmission.

Referring to FIG. 3, shift controller 90 is illustrated in detail. Gear shift switch array 190 comprises a plurality of parallel connected switches labeled P, R, N, D, H, L, UP and DOWN, which, though shown associated with shift controller 90 are usually co-located with a push button array or gear shift lever 190A. Closure of one of the switches of array 190 indicates the gear or gearshift change direction selected by a driver. If a lever is used those skilled in the art will realize that array 190 allows closure of only one of switches P, R, N, D, H and L at a time. Up and down are biased open. The selected gearshift 190 switch is read by a digital input interface 302 which buffers the most recent operator selection for microcontroller 304.

Microcontroller 304 receives gear change direction selections (i.e. up or down shifts) from a second source, a set of steering wheel switches 290A. Steering wheel switches temporarily close switches in an array of switches in a resistor net 290. The details of the net are not shown, but an example of such a resistor network and its application to control of an automated manual transmission is described in detail in U.S. Pat. No. 6,151,977, the disclosure of which is incorporated herein by reference. In essence, the net provides three parallel-connected three switches, with each switch connected in series with a resistor. The resistances of the resistors differ. A resistor net 290 exhibits changes in resistance depending upon which switch is closed, thereby indicating operator selections. The changes in resistance are reflected by changes in the voltage difference between a reference input 310 and an analog voltage input 312. The voltage difference between reference input 310 and analog voltage input 312 are measured by connection of the inputs to a Zero Volt Return input interface and level shift register 306 and an analog input interface and filter 308, respectively. These devices generate and buffer a digital representation of the voltage difference for input to microcontroller 304. Steering wheel resistor net 290 does not provide explicit choice of a gear, but rather allows the operator to upshift or downshift from the present gear. Steering wheel resistor net 290 also allows the driver to toggle the transmission system between manual to automatic modes of operation.

Power supply circuitry is conventional and is represented by power supply filter 330 which is connected to receive vehicle power (unswitched battery) on input 381 and switched battery power (typically 5 volts) on input 383. Power supply filter provides power to a five-volt regulator 332 which in turn supplies power ($V_P$) to most of the remaining components of shift controller 90. The power supply circuitry and energization of the circuit is conventional and is not described in detail here. Control feedback is provided both filter 330 and regulator 332 by blocking diode 385 from microcontroller 304.

Microcontroller 304 is programmed to carry out functions relating to substantive content for inter-controller messaging or to the operator interface. The first of these is to provide a controller area network message indicating the gear selection for execution by the TCM 16. To effect this function microcontroller 304 must be able to determine user selections using either a gear shift lever, dash mounted buttons, a steering wheel mounted switching network, or other variant on operator controls. The second function of microcontroller 304 is to drive displays which indicate to the operator the current gear selection and the current gear, which may not be the same. In the preferred embodiment, displays indicate to the driver the current selected gear by illumination of an indicator adjacent the gear selector button. A related function is to indicate, responsive to messages received over the CAN from TCM 16, the status of the transmissions. The displays may also be backlit at varying levels depending upon the state of a dimmer controller (not shown) for internal lighting. Dimmer control is typically routed through gauge module 12, to which shift controller 90 is programmed to respond. It may also be implemented by programming shift controller to respond to a signal transmitted over bus 18 by ESC 30, which can also be used to handle vehicle lighting through discrete inputs 55 and outputs 53. A third function of microcontroller 304 is to operate a warning buzzer when the operator attempts a forbidden operation. A fourth function is to provide a specialized signal for direct application to the TCM 16, if required by the manufacturer. One manufacturer that requires such a specialized enable signal over a dedicated line is Eaton. Finally, microcontroller 304 must also recognize the type of TCM 16 connected to bus 18 in order to select the proper message library and to determine if a programmable output 340, which is provided for buffering the specialized signal, is to be used.

Microcontroller 304 receives operator gear selections from one of two sources. The selections come from either digital input interface and filter 302 which is in turn connected to switches 190 which are opened and closed in response to operator movement of a typically floor mounted gear shift selection lever 190A or button controls. As described above, microcontroller 304 also receives operator upshift and downshift selections, and mode selection, from Zero Volt Return input interface and level shift controller 306 and analog input interface and filter 308. Microcontroller 304 can access a non-volatile memory which provides storage for programs and libraries 345 of CAN messages. The libraries provide appropriate CAN messages relating to each of several possible transmission types usable with the vehicle. Microcontroller determines the transmission type from the transmission controller 90 on vehicle power up. If required, in response to detection of predetermined transmission types, microcontroller 304 provides an enable signal which is buffered on a programmable output buffer 340 and passed to the transmission controller over a dedicated hard wire connection on tabs 318 and 320. A buzzer for warning the driver of attempted operations which cannot be executed may be connected to a buzzer output driver tab 328 supported by buzzer driver 338 and enabled by microcontroller 304.

Shift controller 90 exchanges data with other controllers using a CAN interface 342 which is connected to CAN Hi and CAN Lo terminals 318 and 320. The CAN bus 18 is often shielded and the shielding, if present, can be grounded through shift controller 90 on tab 322. Output tabs 324 and 326 provide points of connection for a dedicated hard wire connection to a transmission control module, if required. Tab 328 provides a point of connection to a cab buzzer used to warn an operator. Under some circumstances an instruction to dim the panel for night driving may be provided by a direct hardwire connection by a discrete output from ESC 30. Panel DIM tab 316 provides an input for this signal, which is applied to a pulse width modulated (PWM) interface clamp and filter 310, which is in turn connected to microcontroller 304. Through pulse width modulation virtually any desired illumination intensity may be obtained.

Figure 6:
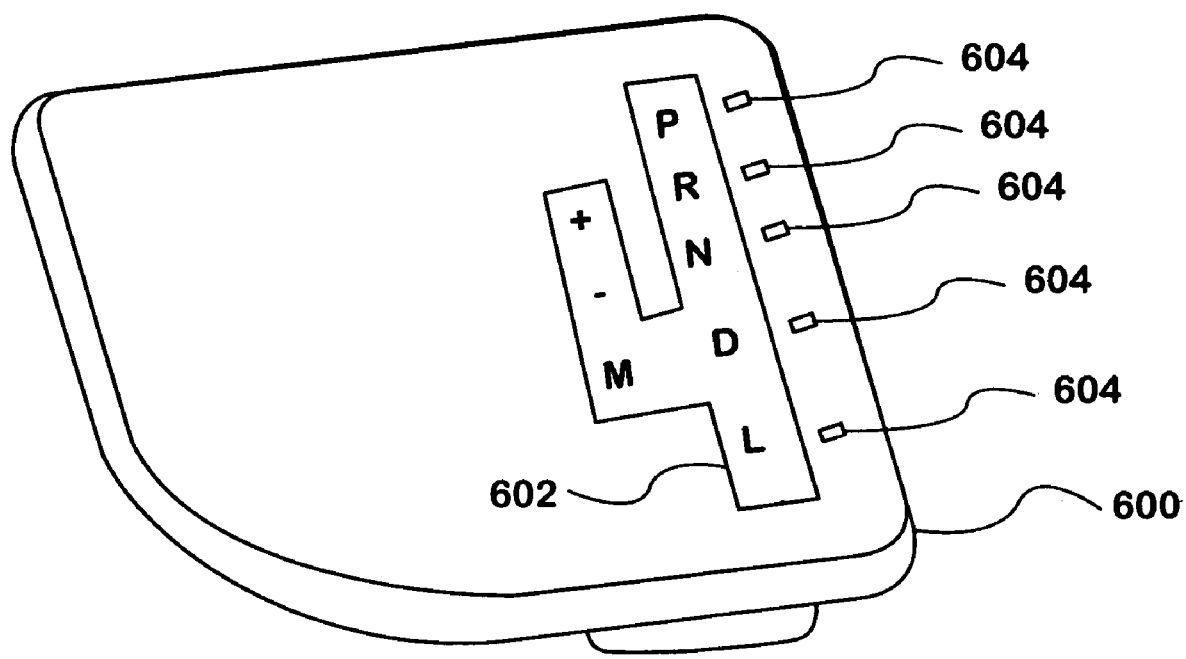
FIG. 6 is a status display for a transmission.

Microcontroller 304 is further connected to control certain displays within a cab indicating to the driver the selected and actual gears in use, as well as the transmission's operational mode. A display 600 is illustrated in FIG. 6 and includes a backlit panel 602 marked with symbols. Panel 602 may be backlit during low light conditions, as indicated by the vehicle panel light being illuminated. The operator selected mode and gear position are more brightly lit. A series of LED's 604 are arrayed next to symbols indicating gear selections. An LED is lit to indicate the actual state of the transmission, as indicated to shift controller 90 by TCM 16. Microcontroller 304 provides for control of the lighting of panel 602 (of FIG. 6) and LED array 604. LED driver PWM backlight 334 illuminates keypad 602, and LED driver key pad 336 illuminated the array of LED's 604. The energization circuits 334 and 336 are routine for those skilled in art and not illustrated in greater detail.

Figure 4:
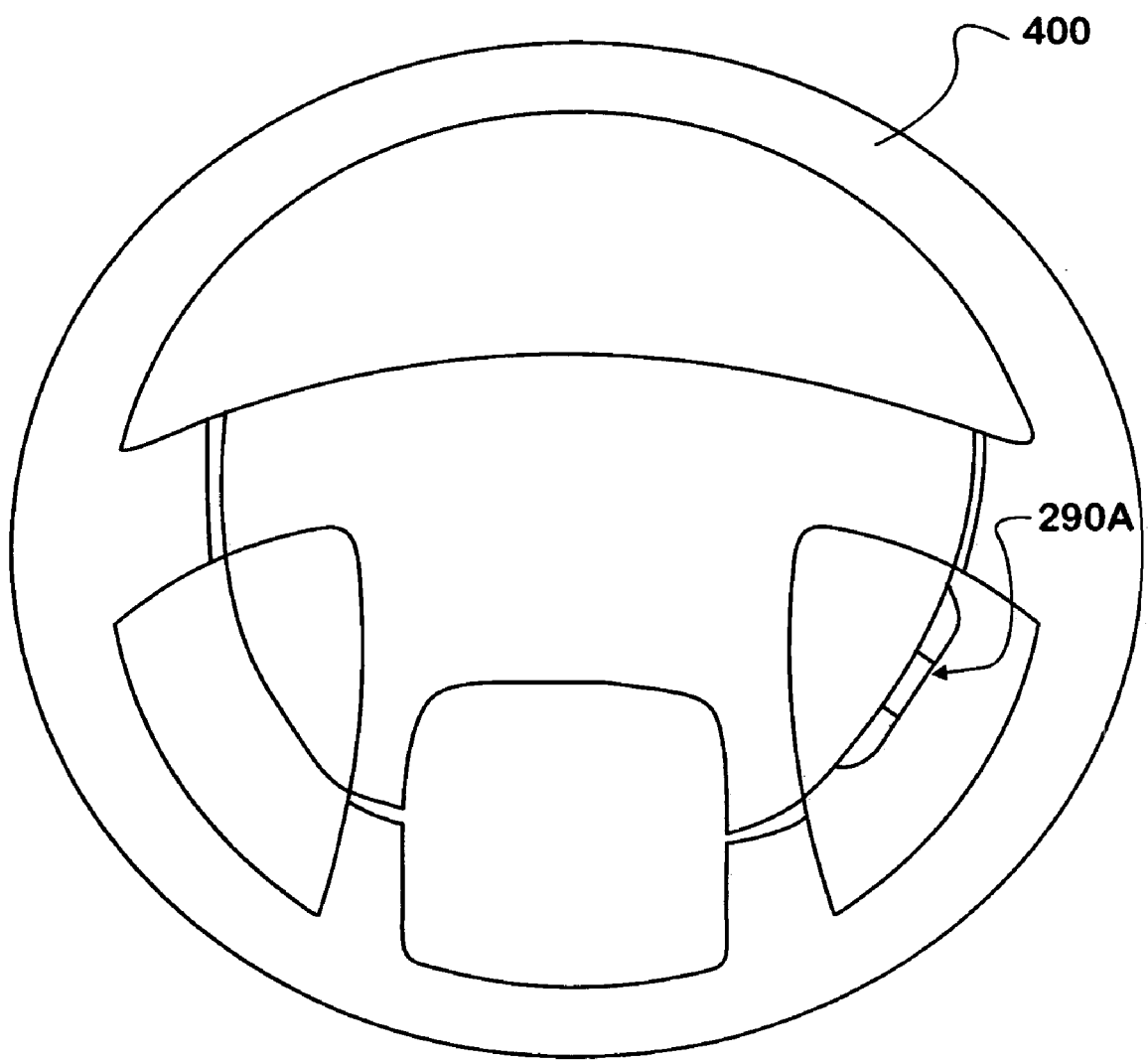
FIG. 4 is front view of a steering wheel fitted with control switches for the multi-transmission gearshift controller.
Figure 5:
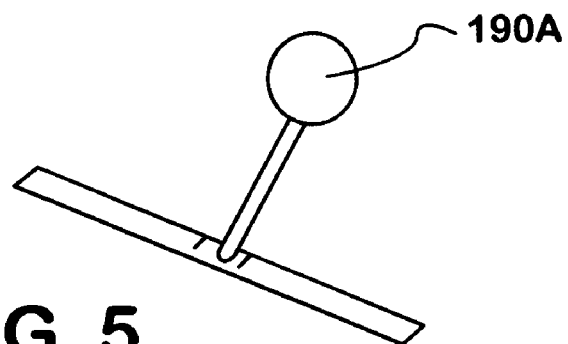
FIG. 5 is a perspective view of a floor mounted gear selector lever for the multi-transmission gearshift controller.

FIGS. 4 and 5 illustrate a steering wheel 400 and a gearshift lever 190A which together can provide an operator's transmission controls. Gearshift lever 190A is moved to control which of switches in array 190 is closed. Steering wheel 400 supports an array of three buttons 290A which are used to control closure of switches in a switch array 290.

Microcontroller 304 may further include programming for diagnostic routines such as detection of a stuck switch or a communications failure. Such failures may be reported using diagnostic codes which may be coupled to a diagnostic computer over diagnostic port 36 or which may be indicated to the driver by flashing the display LED's for keypad 602 or array 604. The pattern of flashes may be used to indicate the nature of the problem.

FIG. 6 illustrates a control panel insert 600 which provides a backlit keypad 602 and an array of LED indicator lights 604. Indicator lights 604 indicate that actual transmission status. Backlit keypad 602 provides operator selection switches 190 and illuminates the current selection.

Figure 7:
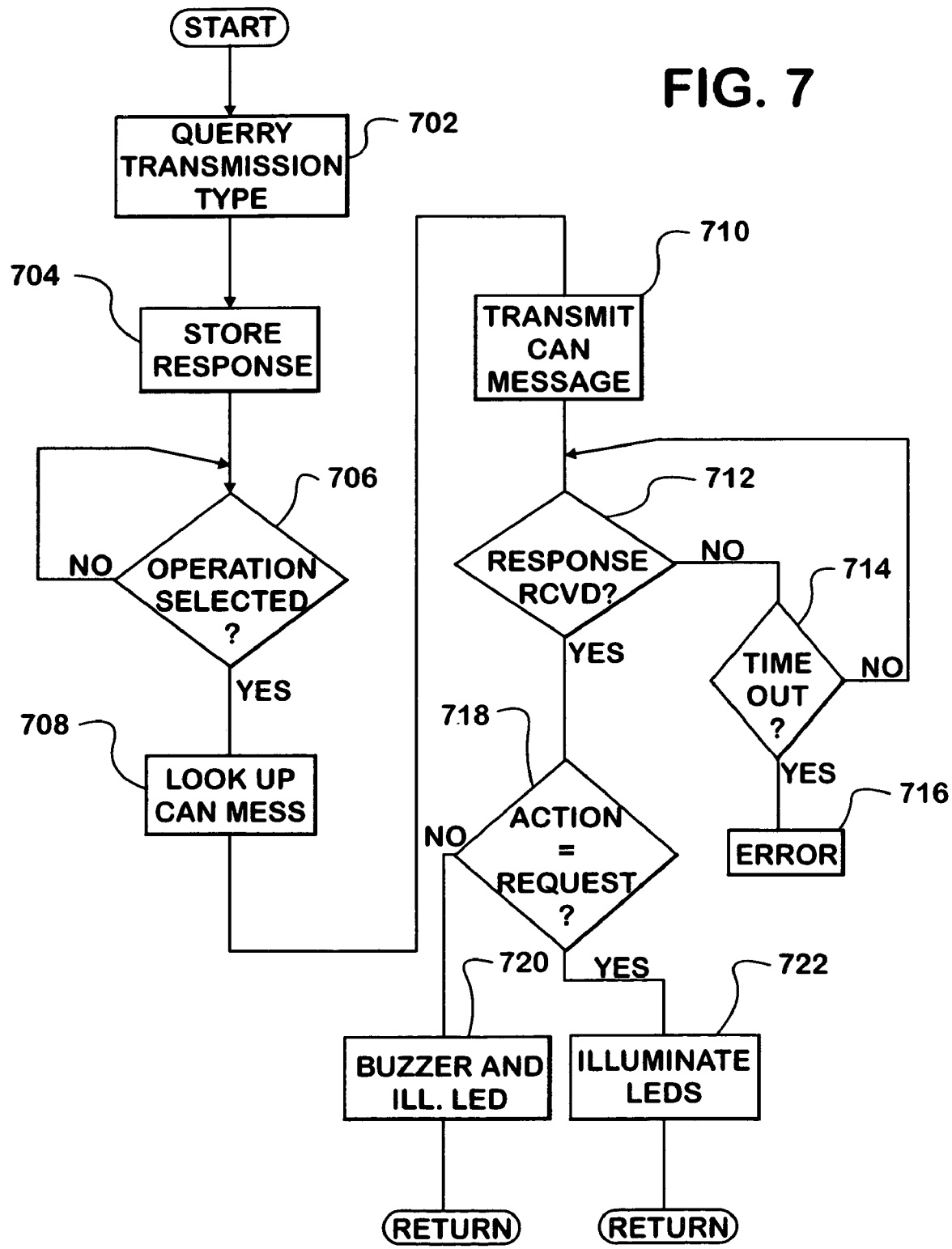
FIG. 7 is a high level flow chart illustrating operation of the shift controller.

Referring to FIG. 7 a high level flow chart illustrating operation of microcontroller 304 is discussed. On power up at step 702 microcontroller generates an inquiry for transmission over bus 18 to determine the type of the transmission. As already noted, the response to this inquiry will determine which library of messages the microcontroller uses for later communication with the transmission controller 16. At step 704 the response is stored. Obviously, if no response is received a communication failure is indicated on display 600. Next, at step 706 the program loops along the NO branch to wait for an operator selected operation. Once an operation selection is detected the YES branch is followed to step 708 and step 710 the CAN message is transmitted. The program than awaits the transmission controller's response, which depends upon whether the transmission controller's programming allows the selection. Again a time out operation may be built in the wait loop comprising steps 714 and 716 are executed to determine if a delay indicates a communication failure. Once a message is received, the YES branch is followed to step 718 to determine if the action taken by the transmission controller matches the request. If YES step 722 is executed to illuminate the appropriate LED's. If NO, step 720 is executed to activate the warning buzzer and to illuminate LED's indicating the mismatch in request and action.

The invention provides a uniform interface between operator controls and an automated manual transmission controller, implemented at least substantially, and usually completely over a CAN network. A shift controller includes a library of functions and messages allowing a vehicle to be built with any of a choice of transmissions and transmission controllers without reprogramming of either the transmission controller or the shift controller. Transmissions can even be swapped out for servicing without the need for reprogramming.

While the invention is shown in only one of its forms, it is not thus limited but is susceptible to various changes and modifications without departing from the spirit and scope of the invention.

What is claimed is:

1. A gearshift to transmission controller interface comprising:
   a controller area network:
   operator transmission controls;
   a shift controller coupled to the operator transmission controls and to the controller area network, the shift controller including logic means for determining operator selections input through the operator transmission controls and memory accessible by the logic means storing a library matching possible operator selections with message types and for sending messages identifying operator selections over the controller area network; and
   a transmission control module coupled to the controller area network for receiving messages identifying operator selections and programmed to respond thereto, and for generating transmission status signals and sending the transmission status signals over the controller area network.

2. A gear shift to transmission controller interface as set forth in claim 1, further comprising:
   display elements for providing indication of operator selections and transmission status; and
   the shift controller further including display element driver circuitry for illuminating a current operator selection responsive to the input to the operator controls and for indicating a reported transmission state received over the controller area network.

3. A gear shift to transmission control interface as set forth in claim 2, further comprising:
   the transmission control module being programmed to provide a transmission type message over the controller area network.

4. A gearshift to transmission control interface as set forth in claim 2, the operator controls further comprising:
   gear selection inputs; and
   a steering wheel mounted switch set allowing operator inputs for up and down shifts and operating mode selection.

5. A gear shift to transmission control interface as set forth in claim 3, further comprising:
   program means stored on the memory for the shift controller for execution on power up for identifying the transmission from the transmission type message when received over the controller area network.

6. A gear shift to transmission control interface as set forth in claim 5, further comprising:
   program means executed by the shift controller for timing responsiveness of the transmission control module to messages from the shift controller and, responsive to an delay beyond a predetermined limit, indicating a communication failure.

7. A mobile vehicle comprising:
   a manual transmission;
   a controller area network data bus;
   a plurality of vocational controllers connected for communication over the controller area network data bus, the plurality of vocational controllers including a transmission control module also coupled to the manual transmission for the control thereof;
   a transmission status display;
   operator instrumentalities for control of the manual transmission; and
   a shift controller connected to the transmission status display for providing indications of transmission status to an operator and further connected to the operator instrumentalities for receiving operator inputs and still further connected to the controller area network for transmitting and receiving messages from at least one of the plurality of vocational controllers, the shift controller providing an interface between the operator instrumentalities and the automated manual transmission controller with the shift controller including a library of message types categorized by transmission type for generating controller area network messages responsive to the operator instrumentalities where the shift controller determines the transmission type from the transmission control module over the controller area network.

8. A mobile vehicle as set forth in claim 7, further comprising:
   the transmission status display providing indication of operator selections and transmission status; and the shift controller further including display element driver circuitry for illuminating a current operator selection responsive to operator inputs and transmission status responsive to reported transmission state as received over the controller area network.

9. A mobile vehicle as set forth in claim 8, further comprising:

the transmission control module being programmed to provide transmission state messages over the controller area network.

10. A mobile vehicle as set forth in claim 9, the operator instrumentalities further comprising:

a gear shift means; and a steering wheel mounted switch set allowing operator inputs for up and down shifts and operating mode for transmission to the transmission control module.

11. A mobile vehicle as set forth in claim 10, further comprising:

program means stored on memory for the shift controller for execution on power up for identifying the transmission from the transmission control module over the controller area network.

12. A mobile vehicle as set forth in claim 11, further comprising:

program means executed by the shift controller for timing responsiveness of the automated manual transmission controller to messages from the shift controller and, responsive to delay beyond a predetermined limit, indicating a failure of communication on the transmission status display.

* * * * *